(12) United States Patent
Shaath

(10) Patent No.: US 6,370,545 B1
(45) Date of Patent: Apr. 9, 2002

(54) METHOD OF ACCESSING REMOVABLE STORAGE MEDIA

(75) Inventor: Kamel Shaath, Kanata (CA)

(73) Assignee: KOM Networks, Ontario (CA)

( * ) Notice: Subject to any disclaimer, the term of this patent is extended or adjusted under 35 U.S.C. 154(b) by 0 days.

(21) Appl. No.: 09/364,074

(22) Filed: Jul. 30, 1999

Related U.S. Application Data
(60) Provisional application No. 60/134,059, filed on May 13, 1999.

(30) Foreign Application Priority Data

Apr. 29, 1999 (CA) .............................................. 2270698

(51) Int. Cl.$^7$ .............................................. G06F 17/30
(52) U.S. Cl. ........................ 707/200; 711/112; 711/202; 369/272
(58) Field of Search ................................. 707/200–202, 707/1–3; 711/4, 115, 202, 112, 205, 206; 369/272

(56) References Cited

U.S. PATENT DOCUMENTS

| | | | |
|---|---|---|---|
| 4,958,314 A | 9/1990 | Imai et al. .................. 364/900 |
| 4,975,898 A | 12/1990 | Yoshida ....................... 369/100 |
| 5,214,627 A | 5/1993 | Nakashima et al. .......... 369/32 |
| 5,537,636 A | 7/1996 | Uchida et al. ............... 395/600 |
| 5,613,097 A | * 3/1997 | Bates et al. ..................... 707/3 |
| 5,708,650 A | 1/1998 | Nakashima et al. ..... 369/275.3 |
| 5,711,672 A | * 1/1998 | Redford et al. ............. 434/307 |
| 5,717,683 A | 2/1998 | Yoshimoto et al. ...... 369/275.3 |
| 5,825,728 A | 10/1998 | Yoshimoto et al. ........... 369/32 |
| 5,832,213 A | * 11/1998 | Duncan ....................... 713/202 |
| 5,850,566 A | 12/1998 | Solan et al. ................. 395/825 |
| 5,896,546 A | * 4/1999 | Monahan et al. ........... 395/830 |
| 6,119,131 A | * 9/2000 | Cabrera et al. ............. 707/203 |

* cited by examiner

Primary Examiner—Hosain T. Alam
(74) Attorney, Agent, or Firm—Venable; Ralph P. Albrecht

(57) ABSTRACT

A method is disclosed for accessing a removable storage medium. The removable storage medium is inserted within a removable storage drive. When the newly inserted removable storage medium is detected, an identifier is read therefrom. The identifier is used to determine if a symbolic link to that medium already exists. When a symbolic link exists, the symbolic link is updated to reflect the physical path to the storage medium. When the symbolic link does not exist, a symbolic link is created linking the identifier to the storage medium. The symbolic link indicates a non-standard storage medium. The symbolic link is then used to read data from and write data to the storage medium.

23 Claims, 3 Drawing Sheets

METHOD OF ACCESSING REMOVABLE STORAGE MEDIA

This application claims benefit of Prov. No. 60/134,059 filed May 13, 1999.

FIELD OF THE INVENTION

The invention relates generally to mass storage devices and more particularly to a method of using mass storage devices with graphical user interfaces and remote access type applications.

BACKGROUND OF THE INVENTION

In the early days of computers, operating systems provided few file system tools. Of course, since most early computer systems supported only a small number of storage devices, manual searching for a particular file was not uncommon or onerous. For example, to locate a particular file, one would know the identifier for a device—A: in MS DOSE®—and based on the identifier, one could request a directory listing. Listing of each available device, A:, B:, C:, D: etc. was done until there were no more devices or the desired file was found.

Because the above method has an efficiency relating to the size and number of devices, tools were developed to automatically catalogue contents of a disk for a user to peruse. These tools would provide a single listing of all files that could be sorted or searched by a user.

With the proliferation of the graphical user interface, tools such as find file and file management utilities have become the norm. These tools are very valuable tools for day to day use of computer systems. Unfortunately, when a computer has a large number of devices attached thereto, these tools require extensive amounts of system resources in order to manage the devices. Also, when the devices are removable, it is common that the tools cannot recognise that the device is or is not present at a given moment.

Conventional operating systems change a file access path to a removable media when the media is moved from one drive, device and/or PC to another. Unfortunately, with removable media, it is quite difficult to ensure that a removable medium is always returned to a same device. Since removable media are often removed—replaced by other removable media—when they are needed again, the replacement media may still be required and a different device is therefore used.

When media is moved from one drive to another, its file access path changes. In a volatile environment, where devices are swapped frequently, the file access path changes frequently. Thus, to access a same file requires different identifiers each time the media is replaced in a different device. However, many applications store complete paths and expect this path will not change. If such as application looks for a file and the device identifier in the form of a drive letter for Windows NT®, has changed, it will not be able to locate the file.

Also, with the proliferation of broadband communications, it has become common that access to a computer system is provided to a larger base of users. The Internet is a commonly available example of this. On the Internet, there are sites devoted to information dissemination. Some of these sites have a considerable amount of proprietary information. In order to provide users access to information within a site, two methods are commonly employed. First, the information is stored in a public directory, which can be accessed by anyone. This is effective when copying of the information is expected. A user accessing the site can copy the entire contents of the site to his or her own storage medium. Obviously, this is not always desired. A second common method is to use a software program to retrieve the information and provide it to the users. Commonly, the data accessed by the software application is also accessible to the users. Therefore, once again, the data can be found and copied.

It would be advantageous to provide a method of storing publicly accessible data that is difficult or impossible to access absent the use of a software interface provided at or by the information source.

In order to overcome these and other limitations of the prior art, it is an object of the present invention to provide a method of storing immediately accessible data that is not recognised by the system tools within a Windows NT® system.

SUMMARY OF THE INVENTION

In accordance with the invention there is provided a method of accessing a removable storage medium from a computer system in execution of an operating system having a plurality of file system commands and at least a file system tool, the method comprising the steps of:

providing a removable storage medium;

mounting the removable storage medium such that it is accessible through some file system commands but inaccesible through a file system tool from the file system tools; and, performing at least one of storing data to and retrieving data from the removable storage medium while it is mounted.

In accordance with the invention there is further provided a method of storing data from a computer system to a removable storage medium comprising the steps of:

mounting the removable storage medium on the computer system, the removable storage medium mounted with an identifier recognisable by the file system but unrecognisable by the system tools;

storing data using the identifier, the data stored within the removable storage medium.

In accordance with the invention there is also provided a method of accessing a removable storage medium from a computer system in execution of an operating system having a plurality of file system commands and at least a file system tool. The method comprises the following steps:

providing a removable storage medium; and, mounting the removable storage medium. The step of mounting the storage medium comprises the following steps:

when a newly inserted removable storage medium is detected, reading from the removable storage medium an identifier determining a presence of a symbolic link for the identifier;

when a symbolic link exists, updating the symbolic link to reflect the physical path to the storage medium;

when the symbolic link does not exist, creating a symbolic link from the identifier to the storage medium, the symbolic link to a non-standard storage medium; and, performing at least one of storing data to and retrieving data from the removable storage medium while it is mounted.

BRIEF DESCRIPTION OF THE DRAWINGS

The invention will now be described with reference to the attached drawings in which.

DETAILED DESCRIPTION OF THE INVENTION

According to the present invention a device is assigned a device name that is unrecognisable to system utilities. In such a fashion, the devices are inaccessible to anyone who does not know an identifier in the form of a path name. Also, the device is not listed on the desktop or with a list of accessible storage media for use with a graphical user interface (GUI). For example, in Windows NT® Disk Administrator, the identifiers do not appear. This allows mounted storage media to appear as if they are not mounted and therefore to be hidden from view or access. In accordance with the preferred embodiment described below, the identifiers are specific to a medium and as such do not change when the medium is moved to a different device.

Figure 1:
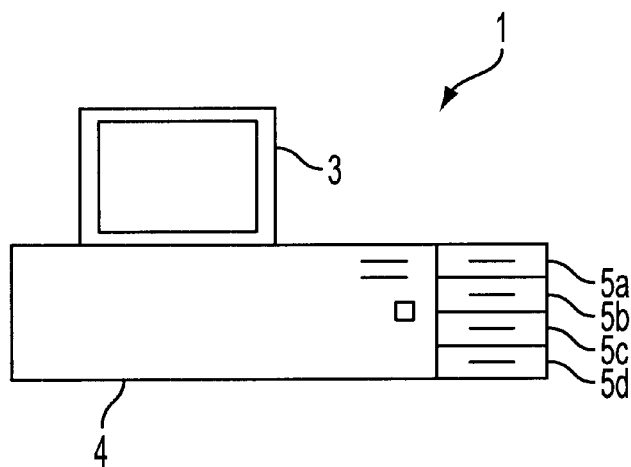
FIG. 1 is a simplified diagram of a hardware system incorporating several removable media devices.

Referring to FIG. 1, a computer system 1 is shown comprising a monitor 3, a processor 4 and four removable media drives in the form of read/write optical disk drives 5a, 5b, 5c, and 5d. A first removable medium for storing data in the form of a fist optical disk is inserted into one of the four optical disk drives 5a. After use, the first optical disk is removed and replaced with another optical disk. When the processor seeks information from the first optical disk, the user is prompted to reinsert it. The user ejects one of the optical disks in use and replaces it with the first optical disk. When the same optical disk drive 5a is used, the disk is easily recognisable. When a different optical disk drive, for example 5b, is used, the optical disk is accessible through a different identifier.

A program in use on the processor seeking further data from the first optical disk, is thwarted because the first optical disk identifier is changed. Alternatively, the first optical disk is always reinserted into optical disk drive 5a and is therefore always recognisable. Unfortunately, this results in bottlenecks when two processes each require information from different optical disks within a same optical disk drive 5a. It will be evident to those of skill in the art that when the optical disk drive 5a forms part of a file server, the problem is compounded many fold.

Therefore, according to the invention a method is provided for storing data on removable media such that they may be replaced in any of a number of removable media drives and yet remain accessible through a same identifier. The identifier is recognisable to the file system of the operating system of the computer system 1. That said, as is explained below, it is important that the identifier not be recognisable to the system tools of the operating system of the computer system 1.

With the advent of writable removable media, several problems have surfaced. A common problem relates to file servers including banks or media. For example when a file server includes 50 optical media devices, a lot of files are immediately accessible. That said, some media are mounted but not inserted at any given time. Thus, a directory of those media requires the media be inserted within a device, be found, and then that directory data is loaded therefrom. File system utilities load this data for users when executed and therefore require a lot of media swapping. A simple example will help outline the problem.

In this example, a system is in execution with 100 mounted removable storage media and 30 physical removable storage media devices in the form of optical disk drives. A file system utility such as a file manager is loaded. The find file function is used to locate a specific file. The file manager is unaware of which disks are physically inserted and which are not so it tries to access the disks one at a time. The result is that the system requests the disks and disk swapping is performed. After much time and much disk swapping, the utility completes its task. Unfortunately, an individual has wasted a lot of time swapping disks. Alternatively, disk swapping is automated and, though no person has wasted time, the file system is slowed tremendously during the time the find file operation is performed.

Also, it is common to have a variety of archived files on the server at any time. Often, it is desired that the data is accessible to some people or programs but not to others. As noted above, this is difficult to achieve. According to the invention, since the system utilities do not recognise the removable media, the removable media are not easily located. By using obscure names, it can be readily achieved that a removable medium is very difficult to locate using trial and error and yet is fully accessible to anyone who knows exactly where to look. Advantageously, the method causes a storage medium to be difficult to find. That said, any program designed to access the medium has a fixed unchanging path for that medium and will therefore access the medium each time correctly.

Figure 3:
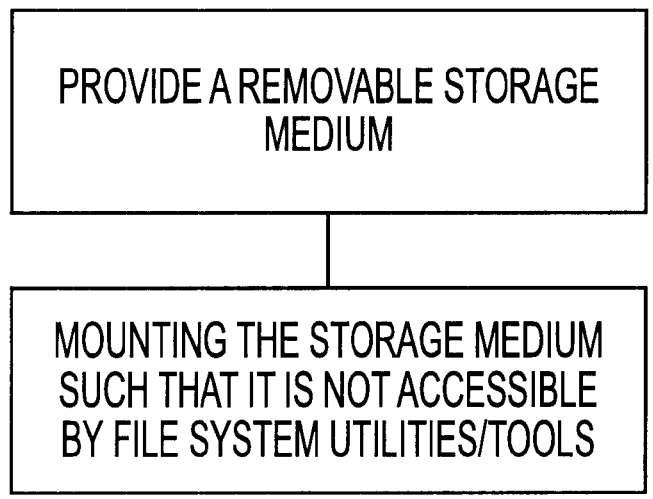
FIG. 3 is a simplified flow diagram of a method of accessing a storage device according to the invention.

Referring to FIG. 3 a simplified flow diagram of a method according to the invention is shown. A medium in the form of removable storage medium is inserted within a hardware device for accessing the medium. The medium is then mounted in a fashion such that it can be accessed by the file system for input/output operations but such that it cannot be accessed by the system utilities/tools.

Figure 4:
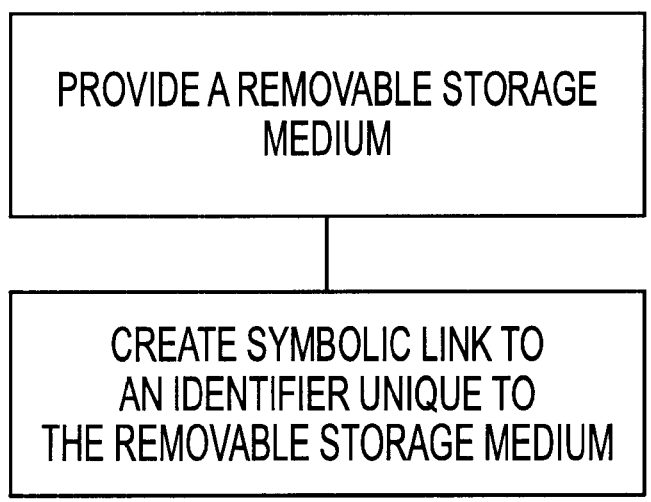
FIG. 4 is a simplified flow diagram of a method of accessing a storage device according to the invention using an identifier unique to the storage medium; and, FIG. 5 is a simplified flow diagram of a method of accessing a storage device according to the invention using symbolic links identified by an identifier determined from the storage medium.

Referring to FIG. 4 a simplified flow diagram of a method according to the invention is shown. A medium in the form of removable storage medium is inserted within a hardware device for accessing the medium. The medium is then mounted by creating a symbolic link to the medium using an identifier unique to the medium. In this fashion, the medium can be accessed by the file system for input/output operations but it cannot be accessed by the system utilities/tools.

Returning to the above example, when an individual accesses the system from a remote site, they can employ system tools to locate files and to browse storage media. According to the invention, browsing of storage media is not possible absent knowledge in advance of the presence of the specific storage medium. This is not a fully secure solution, but tremendously enhances security for remote access to files. For example, a public directory on a non-removable drive such as drive C: is used. When data from other storage media is to be communicated, it is retrieved by a local process that has a list of mounted storage media. Thus, a remote user cannot browse the mounted storage media that are mounted according to the invention without first having a path thereto. Such a path may be very complicated and may include numerous characters. As such, trial and error is unlikely to work.

By allocating a unique and fixed identifier in the form of a drive name to removable media, a file access path is no longer volatile. Hardware devices and computer systems are swappable as required without affecting the drive name. This is highly advantageous when shipping software products for use with data stored on a removable medium. The software accesses the removable medium by its identifier and, as such, does not need to search for the correct storage device. The software will function equally well across a communication medium, if designed to do so, since the storage medium has a known identifier. Even when the storage medium path is unknown or changes frequently, the software is stable.

This is also an advantage in operating systems where the number of usable physical devices and/or media is restricted by the number of identifiers, drive letters, available. One such operating system is Windows NT®. Drive names as implemented in the preferred embodiment do not consume drive letters in such environments.

A drive name according to the invention and for use with Windows NT® consists of a 64 character alphanumeric including all special characters such as: $%'- -@-',.( )I\#& permitting the specification of an extremely large number of drive names. For example, drive name combinations using 26 alphabet characters, 10 digits and 14 special characters would number $50^{64}$ or $5.421 \times 10^{108}$.

Since drive names are hidden from operating system tools, the security of the device and/or media is enhanced. Even though drive names are hidden, the devices referenced by those names are capable of being accessed with standard file system commands. This access is achieved using commands that allow a user to specify the actual path of the drive name. This is very different from mounting and unmounting devices. Each removable medium is mounted and remains mounted though the graphical user interface of Windows NT® does not show the device as present.

Figure 2:
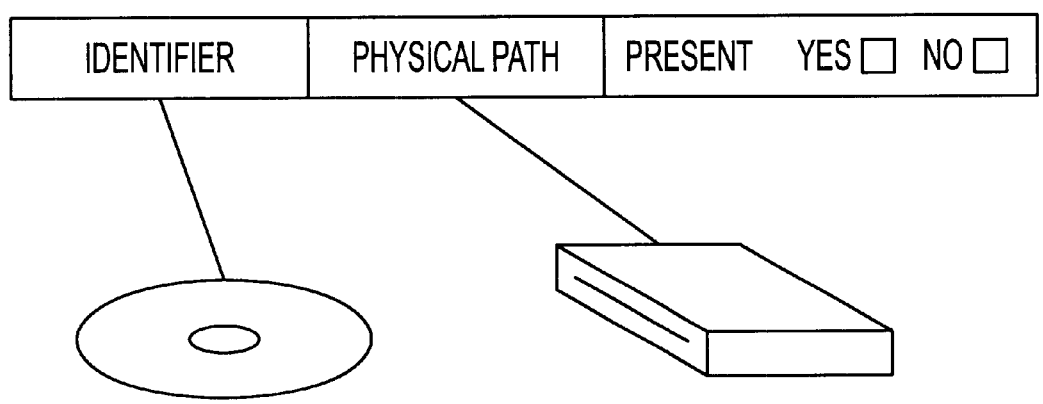
FIG. 2 is a simplified diagram of a symbolic link.

Drive names are created by the creation of a symbolic link. A symbolic link lets a user create a filename or a directory name that, when used, is translated by the operating system into a different file or directory name. Referring to FIG. 2, a simplified diagram of a symbolic link is shown. An identifier that is stored on the physical removable storage medium is stored for the symbolic link. The identifier is preferably unique to the symbolic link and to the removable storage medium. The identifier is, for example, in the form of a name. The symbolic link contains other data for linking the name to the physical device where the named storage medium resides. This data is, for example, in the form of a physical path. The path is likely in the form of a hardware address or an address of a software device driver for the physical device or a combination of the two. Optionally, the symbolic link contains other information relating to the status of storage medium. Examples of further information include present/not present, mounted/unmounted, read/read-write/write only, full, and so forth.

Figure 5:
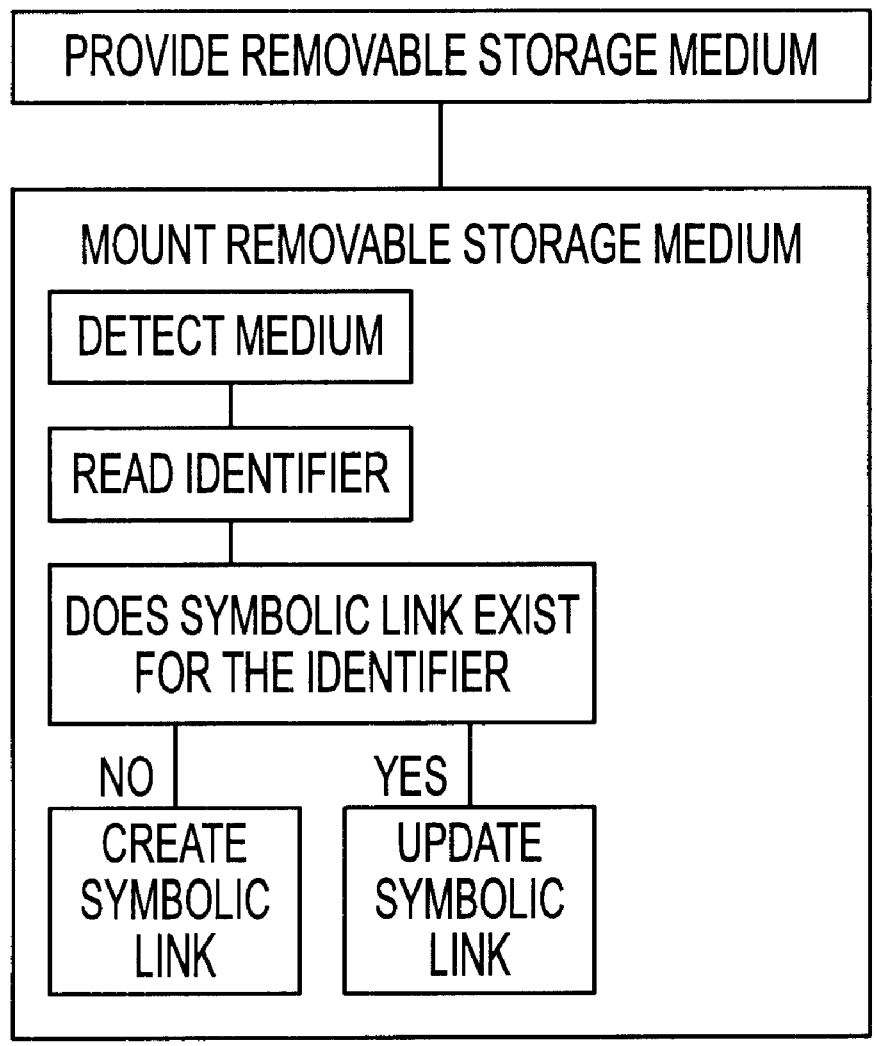

Referring to FIG. 5 a simplified flow diagram of a method according to the invention is shown. A medium in the form of removable storage medium is inserted within a hardware device for accessing the medium. The medium is then mounted and an identifer is read therefrom. The identifier is preferably unique to the storage medium. The symbolic links are then checked to see if one already exists for the identifier of the medium. When one exists, it is updated to reflect the physical drive in which the medium has most recently been inserted. Otherwise, a symbolic link to the medium is created using the identifier of the medium. In this fashion, the medium can be accessed by the file system for input/output operations but it cannot be accessed by the system utilities/tools.

Current operating system implementations do not provide comparable capabilities for removable media devices. It is not obvious to create device names that are inaccessible to an operating system. In fact, current operating system trends and common belief is that a more inclusive and knowledgeable operating system is required to provide ease of use, GUIs, improved performance, and better configurability. The present invention is in contrast to this current belief in the art. By implementing the present invention, it is believed that the ease of use and other benefits of modern operating systems are lost. This has found to not be the case.

Though the preferred embodiment relates to the use of removable storage media with Windows NT® operating system, identifiers according to the invention may be associated with any type of media, such as read-only, write-once and rewritable media and identifiers are usable in most operating systems (OS).

In another alternative embodiment, the method is used with fixed storage media and is used to hide them from view.

Numerous other embodiments of the invention may be envisaged without departing from the spirit or scope of the invention.

What is claimed is:

1. A method of accessing a removable storage medium from a computer system in execution of an operating system having a plurality of file system commands and at least a file system tool, the method comprising the steps of:

providing a storage medium;

mounting the storage medium with an identifier such that it is accessible through some file system commands but inaccessible through a file system tool from at least a file system tool wherein the identifier is not provided to the end user in a list of storage medium identifiers for the file system; and, performing at least one of storing data to and retrieving data from the storage medium using the file system commands, wherein the storage medium is accessed by its identifier, which is a drive name.

2. A method of accessing a removable storage medium as defined in claim 1 wherein the storage medium is a removable storage medium.

3. A method of accessing a removable storage as defined in claim 2 wherein the step of:

mounting the removable storage medium comprises the following steps:

reading from the removable storage medium the identifier; and, creating a symbolic link from the identifier to the storage medium, the symbolic link indicative of the storage medium being other than a standard storage medium of the file system.

4. A method of accessing a removable storage medium as defined in claim 3 wherein a storage medium is accessible through a physical path and wherein the step of:

reading from the removable storage medium an identifier is performed when a newly inserted removable storage medium is detected; the method comprising the following steps:

determining a presence of a symbolic link for the identifier;

when a symbolic link exists, updating the symbolic link to reflect the physical path to the storage medium; and when the symbolic link does not exist, performing the step of: creating a symbolic link from the identifier to the storage medium, the symbolic link to other than a standard storage medium of the file system.

5. A method of accessing a removable storage medium as defined in claim 4 wherein the step of updating the symbolic link is performed such that the symbolic link identifier is unchanged and such that the removable storage medium is accessible through the symbolic link.

6. A method of accessing a removable storage medium as defined in claim 5 wherein the symbolic link is indicative of a storage medium of non-standard format.

7. A method of accessing a removable storage medium as defined in claim 5 wherein the symbolic link is indicative of other than a storage medium.

8. A method of accessing a removable storage medium as defined in claim 2 wherein the step of:
performing at least one of storing data to and retrieving data from the removable storage medium while it is mounted
comprises the step of storing data to the removable storage medium while it is mounted.

9. A method of accessing a removable storage medium as defined in claim 2 wherein the step of:
performing at least one of storing data to and retrieving data from the removable storage medium while it is mounted
comprises the step of retrieving data from the removable storage medium while it is mounted.

10. A method of accessing a removable storage medium as defined in claim 9 wherein the step of:
mounting the removable storage medium is performed such that such that it is inaccessible through all of the file system tools.

11. A method of accessing a removable storage medium as defined in claim 10 wherein the step of:
mounting the removable storage medium is performed such that such that it is accessible through all file system commands.

12. A method of accessing a removable storage medium as defined in claim 2 wherein the step of:
mounting the removable storage medium is performed such that the removable storage medium is unrecognisable to the system tools as a compatible storage medium.

13. A method of storing data from a computer system to a removable storage medium comprising the steps of:
mounting the removable storage medium on the computer system, the removable storage medium mounted with an identifier recognizable by the file system but unrecognizable by the system tools:
storing data using the identifier, the data stored within the removable storage medium, wherein the storage medium is accessed by its identifier, which is a drive name.

14. A method of accessing a removable storage as defined in claim 13 wherein the step of:
mounting the removable storage medium comprises the following steps:
reading from the removable storage medium the identifier; and,
creating a symbolic link from the identifier to the storage medium, the symbolic link to other than a standard storage medium.

15. A method of accessing a removable storage as defined in claim 14 wherein the step of:
reading from the removable storage medium an identifier is performed when a newly inserted removable storage medium is detected; the method comprising the following steps:
determining a presence of a symbolic link for the identifier;
when a symbolic link exists, updating the symbolic link to reflect the physical path to the storage medium; and
when the symbolic link does not exist, performing the step of: creating a symbolic link from the identifier to the storage medium, the symbolic link to other than a standard storage medium.

16. A method of accessing a removable storage as defined in claim 15 wherein the step of updating the symbolic link is performed such that the symbolic link identifier is unchanged and that the removable storage medium is accessible through the symbolic link even when removed and reinserted within a different removable storage compatible device.

17. A method of accessing a removable storage as defined in claim 16 wherein the symbolic link is indicative of a storage medium of non-standard format.

18. A method of accessing a removable storage as defined in claim 16 wherein the symbolic link is indicative of other than a storage medium.

19. A method of accessing a removable storage medium from a computer system in execution of an operating system having a plurality of file system commands and at least a file system tool, the method comprising the steps of:
providing a removable storage medium;
mounting the removable storage medium comprising the steps of:
when a newly inserted removable storage medium is detected, reading from the removable storage medium an identifier;
determining a presence of a symbolic link for the identifier; and, when the symbolic link does not exist, creating a symbolic link from the identifier to the storage medium, the symbolic link to other than a standard storage medium; and,
performing at least one of storing data to the retrieving data from the removable storage medium, wherein the storage medium is accessed by its identifier, which is a drive name.

20. A method of accessing a removable storage medium as defined in claim 19 comprising the step of when a symbolic link exists, updating the symbolic link to reflect the physical path to the storage medium.

21. A method of accessing a removable storage medium as defined in claim 19 comprising the step of when a symbolic link exists, generating an error message.

22. A method of accessing a removable storage medium as defined in claim 19 wherein the operating system is a Microsoft Windows® operating system.

23. A method of accessing a removable storage medium as defined in claim 13 wherein the operating system is a Microsoft Windows® operating system.

* * * * *